United States Patent
Stauffer et al.

(10) Patent No.: US 10,008,972 B2
(45) Date of Patent: Jun. 26, 2018

(54) SYSTEMS AND METHODS FOR DETERMINING LOSS OF PHASE FOR POWER PROVIDED TO AN ELECTRIC MOTOR

(71) Applicant: Regal Beloit America, Inc., Beloit, WI (US)

(72) Inventors: Zachary Joseph Stauffer, Fort Wayne, IN (US); Mark A. Brattoli, Fort Wayne, IN (US); Brian L. Beifus, Fort Wayne, IN (US); Maung Saw Eddison, Fort Wayne, IN (US); Ludovic Andre Chretien, Columbia City, IN (US)

(73) Assignee: Regal Beloit America, Inc., Beloit, WI (US)

( * ) Notice: Subject to any disclaimer, the term of this patent is extended or adjusted under 35 U.S.C. 154(b) by 34 days.

(21) Appl. No.: 14/949,399

(22) Filed: Nov. 23, 2015

(65) Prior Publication Data
US 2017/0149371 A1 May 25, 2017

(51) Int. Cl.
*H02P 7/00* (2016.01)
*H02P 29/02* (2016.01)

(52) U.S. Cl.
CPC .......... *H02P 29/022* (2013.01); *H02P 29/023* (2013.01)

(58) Field of Classification Search
CPC ..... H02M 1/32; H02M 7/53871; H02P 6/182; H02P 6/28; B66D 1/46
See application file for complete search history.

(56) References Cited

U.S. PATENT DOCUMENTS

| | | | |
|---|---|---|---|
| 7,355,866 B2 | 4/2008 | Hsieh et al. | |
| 8,031,446 B2 | 10/2011 | Hsieh et al. | |
| 9,325,553 B2* | 4/2016 | Kaukovuori | H04B 1/0057 |
| 2008/0303463 A1* | 12/2008 | Darby | D06F 37/304 |
| | | | 318/400.09 |
| 2009/0302792 A1* | 12/2009 | Osada | H02P 29/032 |
| | | | 318/400.21 |
| 2010/0052589 A1* | 3/2010 | Hsieh | H02H 7/09 |
| | | | 318/490 |
| 2012/0139461 A1* | 6/2012 | Suzuki | H02P 27/085 |
| | | | 318/400.02 |
| 2012/0187877 A1* | 7/2012 | Yamagiwa | H02K 1/276 |
| | | | 318/400.02 |
| 2014/0232309 A1* | 8/2014 | Zhou | H02P 27/08 |
| | | | 318/400.02 |
| 2014/0254217 A1* | 9/2014 | Li | G01R 21/06 |
| | | | 363/37 |
| 2016/0013746 A1 | 1/2016 | Skinner et al. | |

* cited by examiner

*Primary Examiner* — Shawki S Ismail
*Assistant Examiner* — Zoheb Imtiaz
(74) *Attorney, Agent, or Firm* — Armstrong Teasdale LLP

(57) ABSTRACT

An electric motor controller for controlling an electric motor and methods of determining a loss of phase condition for at least one phase of three-phase input power provided to an electric motor controller are provided. The controller is configured to obtain phase sample data representing an input power electrical characteristic for at least one phase of three-phase power received by the controller and receive direct current (DC) bus data representing a measured DC bus electrical characteristic. The controller is also configured to calculate a ratio between the phase sample data and the DC bus data, and determine that a loss of phase condition exists for a phase of the three-phase power when the ratio exceeds a predetermined threshold.

18 Claims, 4 Drawing Sheets

SYSTEMS AND METHODS FOR DETERMINING LOSS OF PHASE FOR POWER PROVIDED TO AN ELECTRIC MOTOR

BACKGROUND

The field of the disclosure relates generally to electric motors, and more specifically, to systems and methods for determining a loss of phase condition for a phase of three-phase input power provided to an electric motor controller.

At least some known three-phase electric motors start by receiving three-phase power, but lose a phase or suffer a voltage drop on a phase after startup. Such motors typically continue to operate but will run at higher temperatures and/or receive higher input current at a controller of the motor. Such a loss of phase condition may destroy winding insulation and/or shorten the life expectancy of electronic components such as direct current (DC) bus capacitors, ultimately burning out the motor and may only take a few minutes to occur. Accordingly, detection of input phase loss may also be used to trigger an alarm or fault for safe continued operation or shutdown. Conventional phase loss detection techniques, however, are generally either complicated and costly or unable to adequately detect all phase loss conditions.

BRIEF DESCRIPTION

In one aspect, an electric motor controller for controlling an electric motor is provided. The controller is configured to obtain phase sample data representing an input power electrical characteristic for at least one phase of three-phase power received by the controller and receive direct current (DC) bus data representing a measured DC bus electrical characteristic. The controller is also configured to calculate a ratio between the phase sample data and the DC bus data, and determine that a loss of phase condition exists for a phase of the three-phase power when the ratio exceeds a predetermined threshold.

In another aspect, a method of determining a loss of phase condition for at least one phase of three-phase input power provided to an electric motor controller of an electric motor is provided. The method includes obtaining phase sample data representing an input power electrical characteristic for at least one phase of the three-phase power received by the controller, and receiving direct current (DC) bus data representing a measured DC bus electrical characteristic. The method also includes calculating a ratio between the phase sample data and the DC bus data, and determining that a loss of phase condition exists for a phase of the three-phase power when the ratio exceeds a predetermined threshold.

The features, functions, and advantages that have been discussed can be achieved independently in various configurations or may be combined in yet other configurations, further details of which can be seen with reference to the following description and drawings.

DETAILED DESCRIPTION

Figure 1:
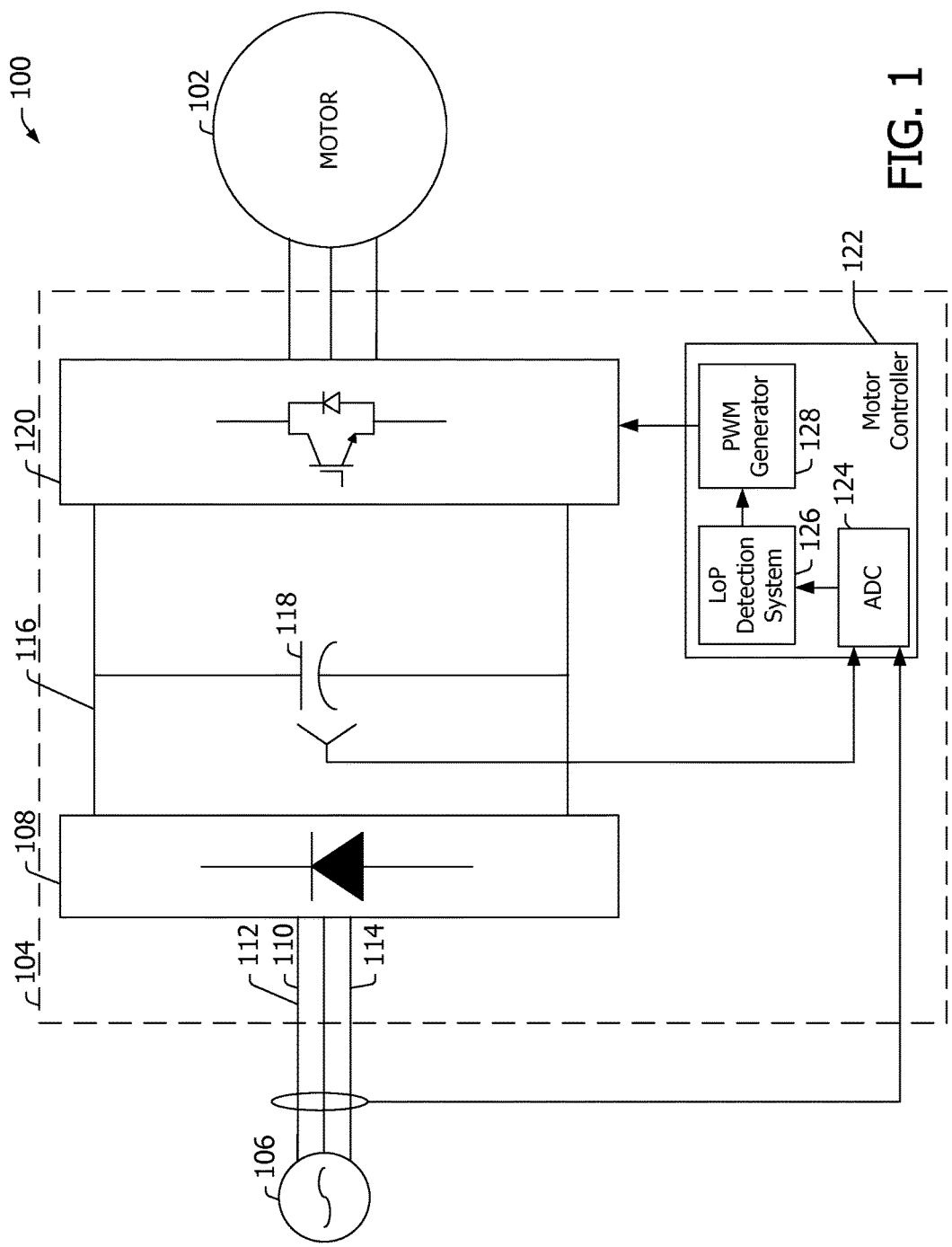
FIG. 1 is a schematic circuit diagram of an exemplary motor assembly.

FIG. 1 is a schematic circuit diagram of an exemplary motor assembly 100 including an electric motor 102 and a motor drive circuit 104. Motor assembly 100 is configured to be coupled to a power source 106 for receiving input power to drive electric motor 102. In the exemplary embodiment, electric motor 102 is an electronically commutated motor. In other embodiments, electric motor 102 may be any type of electric motor, including for example, a permanent magnet synchronous motor (PMSM), a stepper motor, any motor coupled to a variable frequency drive, etc. In some embodiments motor 102 may be used in air moving applications used in the heating, ventilation, and air conditioning (HVAC) industry, may be used in fluid pumping applications, and/or may be used in commercial and industrial applications. In other embodiments, electric motor 102 may engage any suitable work component and be configured to drive such a work component.

In the exemplary embodiment, motor drive circuit 104 is configured to control operation of electric motor 102 using AC power from power source 106. Motor drive circuit 104 includes a rectifier 108 configured to receive three-phase AC power via leads 110, 112, and 114. Rectifier 108 rectifies or converts the AC power from power source 106 to direct current (DC) power, which is provided to a DC bus 116. DC bus 116 includes a DC bus capacitor 118, which may be a single capacitor or multiple capacitors connected in any suitable series, parallel or combination series/parallel configuration. Operation of rectifier 108 causes a DC bus voltage Vdc to be provided across DC bus capacitor 118 usable to control electric motor 102. An inverter 120 inverts the DC bus voltage Vdc to three-phase power to generate one or more AC output signals to drive electric motor 102. In the exemplary embodiment, inverter 120 includes IGBT type switching devices operable according to inverter switching control signals from a motor controller 122 of motor drive circuit 104.

Motor controller 122 is programmed to control operation of a rotating machine portion (not shown) of electric motor 102 and may sometimes be referred to as a microprocessor/DSP. Signals received from electric motor 102 at motor controller 122 include signals relating to input power electrical characteristics for each phase of the three-phase input power and a DC bus electrical characteristic. In some embodiments, such signals may be converted from analog to digital by an analog-to-digital converter (ADC) 124. In turn, ADC 124 provides data to a phase loss detection system 126, which determines whether a loss of phase condition exists in at least one phase of the three-phase input power based on the input power electrical characteristics for the three-phase input power and the DC bus electrical characteristic. Phase loss detection system 126 is configured to adjust operation of electric motor 102 when a loss of phase condition is determined. To do so, phase loss detection system 126 transmits control signals to a pulse width modulation (PWM) generator 128, which generates switching control signals to operate the switching devices of inverter 120 to control electric motor 102.

Figure 2:
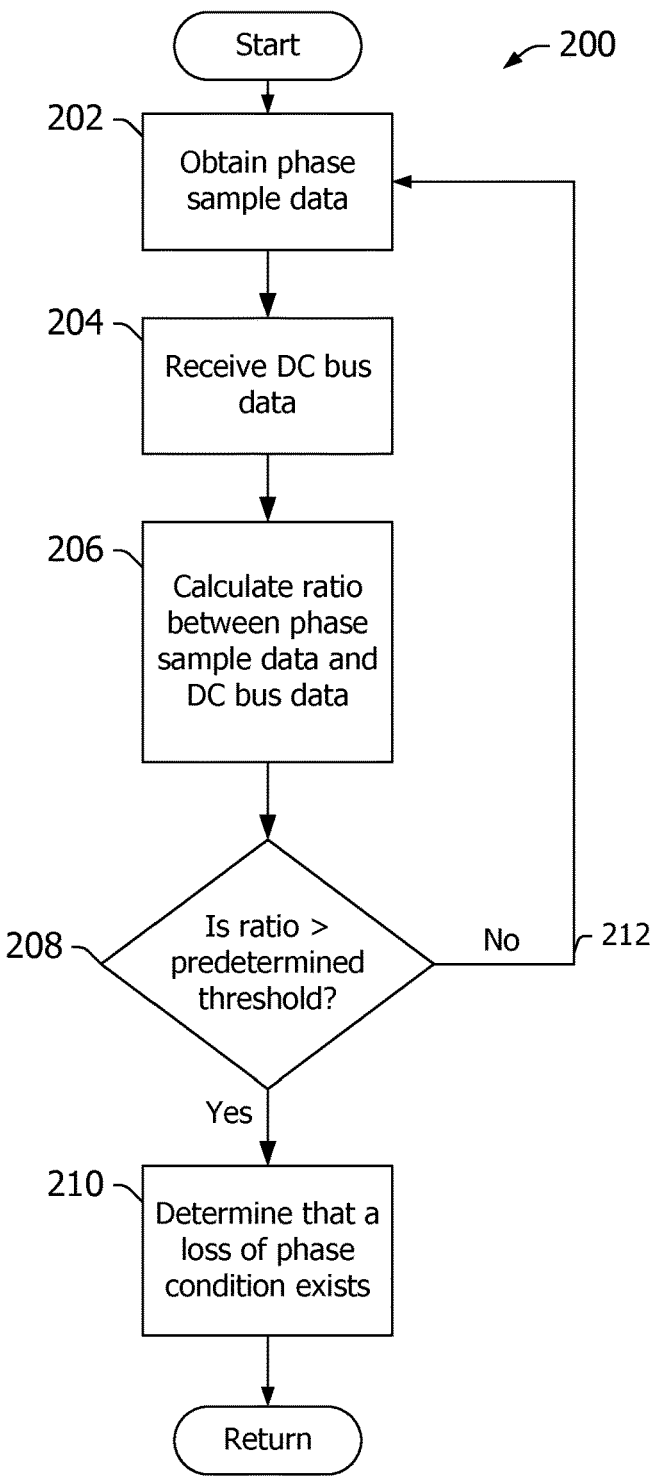
FIG. 2 is a flowchart of an exemplary method of determining a loss of phase condition for a phase of three-phase input power provided to an electric motor controller of an electric motor.

FIG. 2 is a flowchart of an exemplary method 200 of determining a loss of phase condition for at least one phase of three-phase input power provided to motor controller 122 (shown in FIG. 1) of electric motor 102 (shown in FIG. 1). In the exemplary embodiment, motor controller 122 is configured to obtain 202 phase sample data representing an input power electrical characteristic for at least one phase of three-phase power received by motor controller 122. The input power electrical characteristic may be either input voltage or input current. To obtain phase sample data for at least one phase of the three-phase power, motor controller 122 is configured to determine minimum sample data corresponding to a valley of a waveform of the input power electrical characteristic of the three-phase power.

Motor controller 122 is configured to receive 204 direct current (DC) bus data representing a measured DC bus electrical characteristic. The measured DC bus electrical characteristic may be either DC bus voltage or DC bus current. Motor controller 122 is then configured to calculate 206 a ratio between the phase sample data and the DC bus data. Motor controller 122 is further configured to compare 208 the calculated ratio to a predetermined threshold. Motor controller 122 determines 210 that a loss of phase condition exists for a phase of the three-phase power when the ratio exceeds a predetermined threshold. Alternatively, when the ratio does not exceed the predetermined threshold, motor controller 122 determines 212 that a loss of phase condition does not exist and returns to obtain 202 phase sample data.

In the exemplary embodiment, motor controller 122 is further configured to adjust operation of electric motor 102 when a loss of phase is determined. To adjust operation of electric motor 102, motor controller 122 is configured to operate electric motor 102 with a reduced current limit or to shut down electric motor 102. When motor controller 122 is configured to shut down electric motor 102, motor controller 122 is configured to restart electric motor 102 after a predetermined wait time period.

Figure 3:
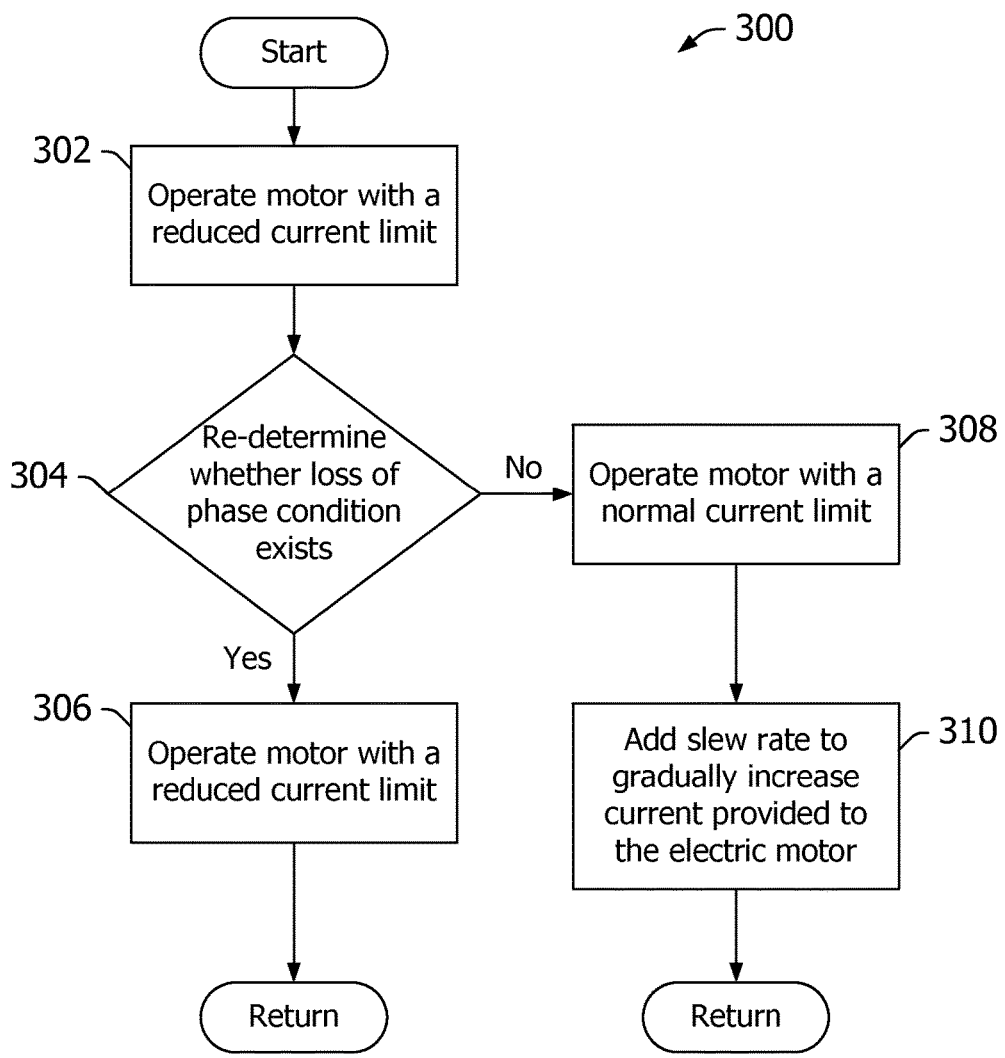
FIG. 3 is a flowchart of an exemplary method of operating the electric motor shown in FIG. 1 with a reduced current limit.

FIG. 3 is a flowchart of an exemplary method 300 of operating electric motor 102 (shown in FIG. 1) with a reduced current limit. To operate electric motor 102 with a reduced current limit, motor controller 122 is configured to operate 302 electric motor 102 with a reduced current limit that is a predefined percentage of a normal operating current limit for electric motor 102. To operate 302 electric motor 102 with a reduced current limit, motor controller 122 is configured to re-determine 304 whether the loss of phase condition exists at predetermined time intervals. Motor controller 122 is further configured to operate 306 electric motor 102 with the reduced current limit when the loss of phase condition is determined.

Alternatively, motor controller 122 is configured to operate 308 electric motor 102 with a normal current limit when the loss of phase condition no longer exists. When returning operation of electric motor 102 to the normal current limit, motor controller 122 is configured to add 310 a slew rate to gradually increase current provided to electric motor 102 until the normal current limit is reached.

Figure 4:
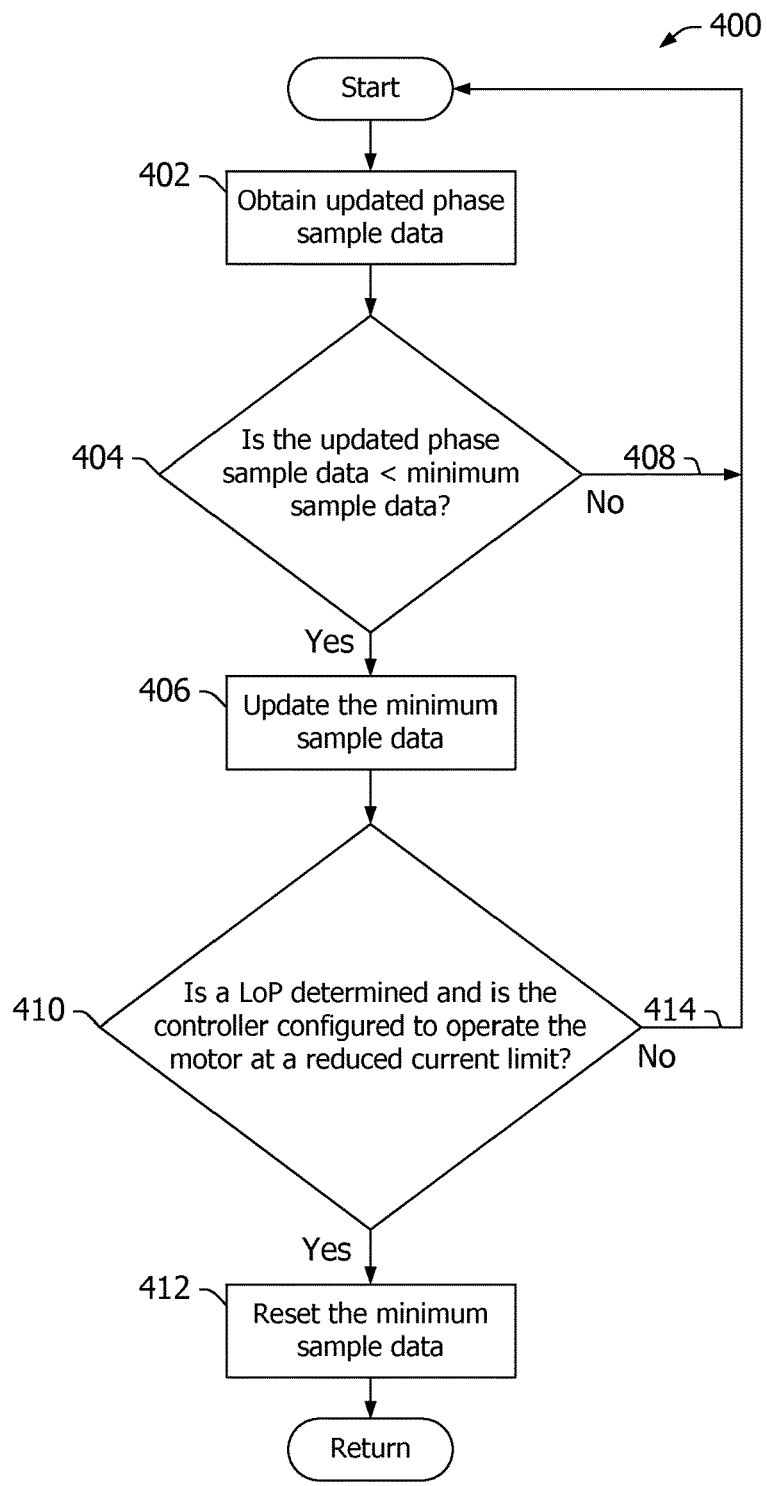
FIG. 4 is a flowchart of an exemplary method of updating minimum phase sample data using the motor controller shown in FIG. 1.

FIG. 4 is a flowchart of an exemplary method 400 of updating minimum phase sample data using motor controller 122 (shown in FIG. 1). Motor controller 122 is configured to obtain 402 updated phase sample data at predetermined time intervals. Motor controller 122 is configured to compare 404 the updated phase sample data to the minimum sample data. When the updated phase sample data is less than the minimum sample data, motor controller 122 is configured to update 406 the minimum sample data with the updated phase sample data. Alternatively, when the updated phase sample data is greater than the minimum sample data, motor controller 122 is configured to return to obtain 408 updated phase sample data at predetermined time intervals.

With the updated 406 minimum sample data, motor controller 122 determines 410 whether a loss of phase condition has been determined and whether motor controller 122 is configured to operate electric motor 102 at a reduced current limit when a loss of phase condition exists. When the loss of phase condition is determined and motor controller 122 is configured to operate electric motor 102 with a reduced current limit in response to a determined loss of phase condition, motor controller 122 is further configured to reset 412 the minimum sample data. Alternatively, when a loss of phase condition is not determined and/or motor controller 122 is not configured to operate electric motor 102 with a reduced current limit in response to a determined loss of phase condition, then motor controller 122 is configured to return to obtain 414 updated phase sample data at predetermined time intervals.

A technical effect of the methods and systems described herein may include one or more of: (a) obtaining phase sample data representing an input power electrical characteristic for each phase of the three-phase power received by an electric motor controller; (b) receiving direct current (DC) bus data representing a measured DC bus electrical characteristic; (c) calculating a ratio between the phase sample data and the DC bus data; and (d) determining that a loss of phase condition exists for a phase of the three-phase power when the ratio exceeds a predetermined threshold.

Exemplary systems and methods for determining a loss of phase condition for a phase of three-phase input power provided to an electric motor controller are described above in detail. The systems and the methods are not limited to the specific implementations described herein but, rather, components of the systems and/or steps of the methods may be utilized independently and separately from other components and/or steps described herein. Further, the described operations and/or components may also be defined in, or used in combination with, other systems, methods, and/or networks, and are not limited to practice with only the network system as described herein.

The systems described herein are not intended to suggest any limitation as to the scope of use or functionality of any aspect of the disclosure. In addition, the systems described herein should not be interpreted as having any dependency or requirement relating to any one or combination of components illustrated in the exemplary operating environment.

The order of execution or performance of the operations in the disclosure illustrated and described herein is not essential, unless otherwise specified. That is, the operations may be performed in any order, unless otherwise specified, and the disclosure may include additional or fewer operations than those disclosed herein. For example, it is contemplated that executing or performing a particular operation before, contemporaneously with, or after another operation is within the scope of aspects of the disclosure.

Although specific features of various implementations may be shown in some drawings and not in others, this is for convenience only. In accordance with the principles of the disclosure, any feature of a drawing may be referenced and/or claimed in combination with any feature of any other drawing.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A drive circuit for controlling an electric motor, said drive circuit comprising:
   a first sensor configured to obtain phase sample data representing an input power electrical characteristic for at least one phase of three-phase power received by said drive circuit;
   a second sensor configured to measure direct current (DC) bus data representing a measured DC bus electrical characteristic; and
   a processing device coupled to said first and second sensors, said processing device configured to:
      receive the phase sample data from said first sensor and the DC bus data from said second sensor;
      calculate a ratio between the phase sample data and the DC bus data;
      determine that a loss of phase condition exists for a phase of the three-phase power when the ratio exceeds a predetermined threshold; and
      adjust operation of the electric motor when a loss of phase is determined.

2. The drive circuit in accordance with claim 1, wherein to adjust operation of the electric motor, said processing device is configured to operate the electric motor with a reduced current limit.

3. The drive circuit in accordance with claim 2, wherein to operate the electric motor with a reduced current limit, said processing device is configured to:
   re-determine whether the loss of phase condition exists at predetermined time intervals;
   operate the electric motor with the reduced current limit when the loss of phase condition is determined; and
   operate the electric motor with a normal current limit when the loss of phase condition no longer exists.

4. The drive circuit in accordance with claim 3, wherein when returning operation of the electric motor to the normal current limit, said processing device is configured to add a slew rate to gradually increase current provided to the electric motor until the normal current limit is reached.

5. The drive circuit in accordance with claim 1, wherein to adjust operation of the electric motor, said processing device is configured to shut down the electric motor.

6. The drive circuit in accordance with claim 5, wherein to shut down the electric motor, said processing device is further configured to restart the electric motor after a predetermined wait time period.

7. The drive circuit in accordance with claim 1, wherein to obtain phase sample data, said processing device is configured to determine minimum sample data corresponding to a valley of a waveform of the input power electrical characteristic of the three-phase power.

8. The drive circuit in accordance with claim 7, wherein said processing device is further configured to:
   obtain updated phase sample data at predetermined time intervals;
   compare the updated phase sample data to the minimum sample data; and
   update the minimum sample data with the updated phase sample data when the updated phase sample data is less than the minimum sample data.

9. The drive circuit in accordance with claim 8, wherein when the loss of phase condition is determined and said processing device is configured to operate the electric motor with a reduced current limit in response to a determined loss of phase condition, said processing device is further configured to reset the minimum sample data.

10. A method of determining a loss of phase condition for at least one phase of three-phase input power provided to a drive circuit for controlling an electric motor, the drive circuit including first and second sensors in communication with a processing device, said method comprising:
    receiving, by the processing device, phase sample data obtained by the first sensor, the phase sample data representing an input power electrical characteristic for at least one phase of the three-phase power received by the drive circuit;
    receiving, by the processing device, direct current (DC) bus data measured by the second sensor, the DC bus data representing a measured DC bus electrical characteristic;
    calculating, by the processing device, a ratio between the phase sample data and the DC bus data;
    determining, by the processing device, that a loss of phase condition exists for a phase of the three-phase power when the ratio exceeds a predetermined threshold; and
    adjusting operation of the electric motor when a loss of phase condition is determined.

11. The method in accordance with claim 10, wherein adjusting operation of the electric motor further comprises operating the electric motor with a reduced current limit.

12. The method in accordance with claim 11, wherein operating the electric motor with a reduced current limit further comprises:
    re-determining whether the loss of phase condition exists at predetermined time intervals;
    operating the electric motor with the reduced current limit when the loss of phase condition is determined; and
    operating the electric motor with a normal current limit when the loss of phase condition no longer exists.

13. The method in accordance with claim 12, wherein when returning operation of the electric motor to the normal current limit, said method further comprises adding a slew rate to gradually increase current provided to the electric motor until the normal current limit is reached.

14. The method in accordance with claim 10, wherein adjusting operation of the electric motor further comprises shutting down the electric motor.

15. The method in accordance with claim 14, wherein shutting down the electric motor further comprises restarting the electric motor after a predetermined wait time period.

16. The method in accordance with claim 10, wherein obtaining phase sample data further comprises determining minimum sample data corresponding to a valley of a waveform of the input power electrical characteristic of the three-phase power.

17. The method in accordance with claim 16, further comprising:
    obtaining updated phase sample data at predetermined time intervals;
    comparing the updated phase sample data to the minimum sample data; and
    updating the minimum sample data with the updated phase sample data when the updated phase sample data is less than the minimum sample data.

18. The method in accordance with claim 17, wherein when the loss of phase condition is determined and the motor controller is configured to operate the electric motor with a reduced current limit in response to a determined loss of phase condition, said method further comprises resetting the minimum sample data.

\* \* \* \* \*